(12) United States Patent
Tanuguchi et al.

(10) Patent No.: US 6,269,895 B1
(45) Date of Patent: Aug. 7, 2001

(54) HYBRID DRIVE SYSTEM

(75) Inventors: Takao Tanuguchi; Shoichi Miyagawa; Kazumasa Tsukamoto; Shigeo Tsuzuki; Kenji Omote; Seiji Suzuki; Takeshi Hara, all of Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/166,958

(22) Filed: Oct. 6, 1998

(30) Foreign Application Priority Data

Oct. 8, 1997 (JP) .................................................. 9-276290

(51) Int. Cl.⁷ ...................................................... B60K 1/00
(52) U.S. Cl. ........................ 180/65.2; 180/65.4; 180/65.1
(58) Field of Search .................. 180/65.2, 65.8, 180/65.4, 65.1, 65.3; 123/348, 347; 701/22, 51; 74/230.17, 866, 689, 868; 475/211; 474/11

(56) References Cited

U.S. PATENT DOCUMENTS

| | | | |
|---|---|---|---|
| 4,152,947 | * | 5/1979 | Deursen et al. .................... 74/230.17 |
| 4,519,275 | * | 5/1985 | Maruyama et al. ..................... 74/866 |
| 4,533,011 | * | 8/1985 | Heidemeyer et al. ............... 180/65.2 |
| 4,619,157 | * | 10/1986 | Sakai ....................................... 74/689 |
| 4,680,987 | * | 7/1987 | Morimoto .............................. 74/866 |
| 4,990,127 | * | 2/1991 | Roberts et al. ....................... 475/211 |
| 5,088,355 | * | 2/1992 | Sugaya et al. .......................... 74/869 |
| 5,813,933 | * | 9/1998 | Tsukamoto et al. .................... 474/11 |
| 5,823,281 | * | 10/1998 | Yamaguchi et al. ................ 180/65.2 |
| 5,887,670 | * | 3/1999 | Tabata et al. ........................ 180/65.2 |
| 5,928,301 | * | 7/1999 | Soga et al. .............................. 701/51 |
| 5,934,396 | * | 8/1999 | Kurita ................................. 180/65.2 |
| 6,102,144 | * | 8/2000 | Lutz ..................................... 180/65.2 |
| 6,116,363 | * | 9/2000 | Frank ................................... 180/65.2 |

FOREIGN PATENT DOCUMENTS

| | | |
|---|---|---|
| 0 781 940 A3 | 7/1997 | (EP) . |
| 0 788 914 A2 | 8/1997 | (EP) . |
| 9-71138 | 3/1997 | (JP) . |

* cited by examiner

Primary Examiner—Michael Mar
Assistant Examiner—Hau Phan
(74) Attorney, Agent, or Firm—Oliff & Berridge, PLC (57) ABSTRACT

In a state a vehicle is stopped at an intersection, an infinitely variable transmission is in a neutral position, a motor/generator rotates with a low speed, an oil pump and an auxiliary equipment are in rotating state. At that time, an input clutch is disengaged, and the internal engine is stopped. When the vehicle is started, a continuously variable transmission performs continuous shift control from the neutral position using hydraulic pressure from an oil pump, and the rotation of the motor/generator is transmitted to drive wheels via a ring gear of a planetary gear. After the vehicle has started driving, the input clutch is engaged and the internal engine is started. The vehicle is driven while the motor/generator assists driving or the motor/generator charges batteries based on operation of the internal engine.

12 Claims, 9 Drawing Sheets

CLUTCH ENGAGEMENT TABLE

| RANGE | CLUTCH | $C_L$ | $C_H$ |
|---|---|---|---|
| P | | | |
| R | | ○ | |
| N | | | |
| D | LOW | ○ | |
| D | HIGH | | ○ |

HYBRID DRIVE SYSTEM

BACKGROUND OF THE INVENTION

1. Field of Invention

The invention relates to a hybrid drive system which drives a vehicle using an internal engine and a motor/generator. More specifically, it relates to a hybrid drive system using an infinitely variable transmission (IVT).

2. Description of Related Art

A conventional hybrid drive system using a continuously variable transmission (CVT) is proposed as described in Japanese Patent Publication Laying-Open No. 9-71138. In this system, an engine and a motor/generator are directly connected to each other via a damper. Further, the output shafts of the engine and the motor/generator are connected to an oil pump and the CVT via a forward-reverse change mechanism having a forward clutch and a reverse brake, and further connected to vehicle wheels via gears and so on.

When the vehicle is stopped at, for example, an intersection, the engine is stopped in order to improve fuel consumption, and engine surging or reviving is prevented by performing a regenerative control to the motor/generator.

In the aforementioned conventional system, the motor/generator is operated as a motor (starter-motor) at the engine start, and after engine is started, the vehicle is moved by engaging, for example, the forward clutch after waiting for an increase in the hydraulic pressure created by the oil pump.

Therefore, the vehicle can not be moved by the motor/generator when the engine is stopped. As a result, it is difficult to improve the fuel consumption and to reduce the exhaust gases in, for example, a town area in which the vehicle is started and stopped repeatedly.

The vehicle is slow to start moving at the restart because the engagement of the forward clutch and a shift operation of the CVT are performed after the hydraulic pressure is increased according to the rotation of the oil pump which is operated by the engine.

When the engine is stopped during a vehicle stop, the auxiliary equipment can not be operated. Even if an electric motor, separate from the described driving system, such as a motor/generator arranged to drive the auxiliary equipment and the oil pump is provided, another driving system is needed, the vehicle cost is increased, and the system becomes complicated.

Further, even if vehicle movement by the motor/generator, without using the engine, is made possible by interposing a clutch between the engine and the motor/generator, when the clutch is disengaged, the oil pump and the auxiliary equipment can not be operated. Therefore, as discussed, another drive system is needed. Further, the clutch is needed to perform slip control at the start of vehicle movement because the CVT can not shift from rotation 0. Such a system is more complicated. Further, the reliability of the hybrid driving system is decreased, based on the durability of the clutch, due to the slip.

SUMMARY OF THE INVENTION

Therefore an object of the invention is to provide a hybrid drive system solving the aforementioned problem by using an infinitely variable transmission (IVT) which can have a neutral position and can shift from rotation 0.

In order to achieve the aforementioned object, the hybrid drive system comprises an internal engine, a motor/generator which rotates and uses or generates electric energy, and an infinitely variable transmission, which comprises a continuously variable transmission arranged between a primary shaft and a secondary shaft and shifting the torque ratio between the shafts continuously, a planetary gear unit comprising a first rotational element interlocking with a primary side of the continuously variable transmission, a second rotational element interlocking with a secondary side of the continuously variable transmission, and a third rotational element composing rotations of the first rotational element and the second rotational element in a state where a torque circulation occurs and provides an output to driving wheels, and which performs a neutral control self-converging in order that the third rotational element is in a neutral position and a shift control shifting continuously from the neutral position to the continuously variable transmission. In the hybrid drive system, the outputs from the motor/generator and/or the internal engine is transmitted to the driving wheels via the infinitely variable transmission.

An input clutch is arranged between the output shaft of the internal engine and the rotor of the motor/generator. The rotor of the motor/generator interlocks with an oil pump.

The vehicle is started by the torque from the motor/generator with the input clutch disengaged, and the infinitely variable transmission is moved to the neutral position and the oil pump is driven by the motor/generator when the vehicle is stopped.

The vehicle is driven by the power of the internal engine upon engagement of the input clutch, and the power of the internal engine is assisted by the output from the motor/generator or electricity is generated by the motor/generator.

The motor/generator is arranged on the primary shaft, the input clutch is arranged in a bore side of the rotor of the motor/generator, and the oil pump is also arranged on the primary shaft.

The rotor of the motor/generator interlocks with auxiliary equipment of the vehicle.

The motor/generator is arranged on the primary shaft, another shaft interlocks with the auxiliary equipment, and is different from the driving system of the primary shaft, so that the another shaft is drivingly-connected with the primary shaft. A clutch is arranged between the rotor of the motor/generator and the auxiliary equipment.

The vehicle is started by the torque from the motor/generator during the period when input clutch is disengaged, and the infinitely variable transmission is moved to the neutral position and the auxiliary equipment is driven by the motor/generator when the vehicle is stopped.

The oil pump interlocks with the rotor of the motor/generator and the output shaft of the internal engine, and the oil pump is driven by one of the motor/generator and the internal engine. The output shaft of the internal engine and the oil pump are interlocked with each other via a one-way clutch, and the rotor of the motor/generator and the oil pump are directly interlocked with each other.

The motor/generator and the oil pump are arranged on the primary shaft and interlocked, another shaft, different from the primary shaft, interlocks with the output shaft of the internal engine via a one-way clutch.

The auxiliary equipment interlocks with the rotor of the motor/generator and the output shaft of the internal engine, and the auxiliary equipment is driven by one of the motor/generator and the internal engine.

The output shaft of the internal engine interlocks with the auxiliary equipment via a one-way clutch, and the rotor of the motor/generator directly interlocks with the auxiliary equipment.

The another shaft interlocks with the auxiliary equipment and is different from driving system, such as the primary shaft. One end of the another shaft interlocks with the rotor of the motor/generator, and the other end of the another shaft interlocks with the output shaft of the internal engine via a one-way clutch.

The another shaft can also by different from the primary shaft and the secondary shaft, with the motor/generator arranged on the another shaft, and the another shaft interlocks with the primary shaft.

The auxiliary equipment is arranged to interlock with the rotational elements of the infinitely variable transmission except for the third rotational element.

According to the invention, a vehicle is stopped in a state where the infinitely variable transmission is in the neutral position as the motor/generator rotates. Therefore, the oil pump and others can be driven without arranging an exclusive driving source. As a result, a feel of delay does not occur at the vehicle start.

When the vehicle is stopped and when the power required for driving a vehicle is small, for example, when the vehicle is in a state just after the vehicle start, the internal engine remains stopped by disengaging the input clutch. Therefore, fuel consumption is improved, the exhaust gas is cleaned, and the motor/generator is started with a low load or almost no load. For example, in the case where a brushless DC motor is used as the motor/generator, it is possible that an expensive rotor position detection sensor is not needed.

The oil pump is always driven with a simple structure.

The vehicle is effectively started by the power of the motor/generator based on a large deceleration ratio of the infinitely variable transmission without rotating the internal engine. Thus, the start control can be performed quickly because the oil pump is always driven while the vehicle is stopped.

The internal engine is kept in a good efficiency state, the vehicle is driven by controlling the motor/generator and the infinitely variable transmission properly. Therefore, fuel consumption is improved and the exhaust gas is cleaned. The vehicle can be started without slip control for the input clutch by the shift from the neutral position of the infinitely variable transmission.

A hybrid drive system having a simple structure is achieved. Further, the primary shaft can be shortened.

The auxiliary equipment is always driven by a simple structure without an another power source. The auxiliary equipment is driven by the primary shaft, but the primary shaft is not required to be long and large. The load of the motor/generator at the motor/generator start is further redacted and a sensor for the motor/generator is not needed.

The vehicle is started effectively by the power of the motor/generator, and the auxiliary equipment, such as a compressor for an air conditioner and/or a pump for power steering, is always driven even when the vehicle is stopped.

The start control and other actions are performed without delay by driving the oil pump using the internal engine in the case where a charge of the battery is insufficient (fail-safe operation). Further, the fail-safe operation is achieved without causing the primary shaft to be long and large and using a simple and compact structure.

The auxiliary equipment is driven by the internal engine in the case where the charge of the battery is insufficient (fail-safe operation). Further, the fail-safe operation is achieved with a simple and compact structure.

The hybrid drive system is axially shortened and the vehicle space required is reduced.

BRIEF DESCRIPTION OF THE DRAWINGS

The invention will be described in conjunction with the following drawings in which like features are designated with like reference characters, and wherein.

DETAILED DESCRIPTION OF PREFERRED EMBODIMENTS

The invention will become more apparent from a detailed description of preferred embodiments with reference to the accompanying drawings.

Figure 1:
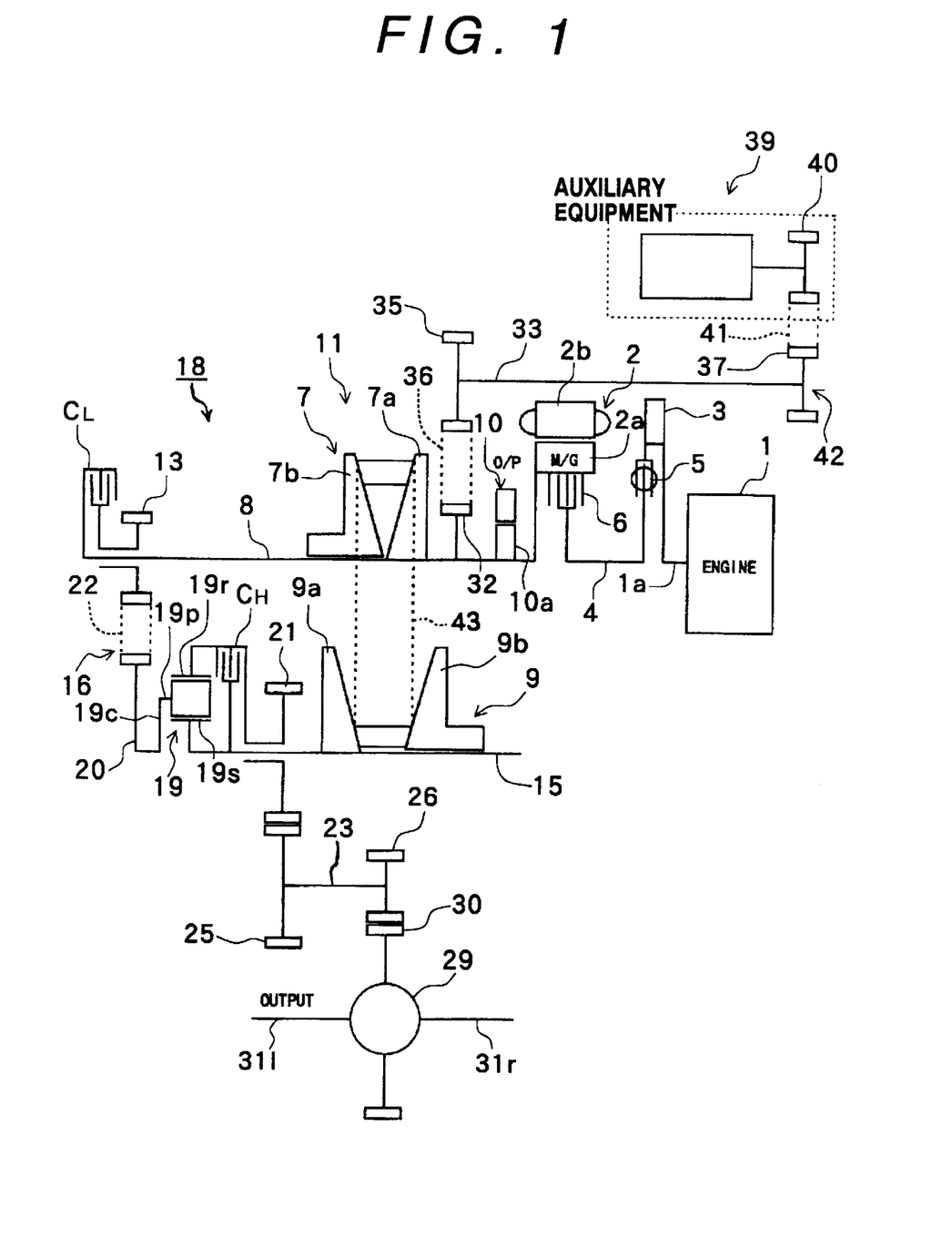
FIG. 1 is a schematic illustration showing a hybrid drive system of first embodiment of the invention.

FIG. 1 shows an outline of a hybrid drive system for a vehicle having an internal engine 1, such as a gasoline engine or a diesel engine, and a motor/generator 2, such as a brushless DC motor. For example, a DC series motor or an induction motor can be used as the motor/generator 2.

The engine output shaft 1*a* of the internal engine 1 is connected to a shaft 4 via a flywheel 3 and a damper 5. An input clutch 6 is interposed between the shaft 4 and the rotor 2*a* of the motor/generator 2. Further, a primary shaft 8, which is aligned with the engine output shaft 1*a* and the center shaft of the rotor 2*a* and connected to the rotor 2*a*, is connected to the rotation side 10*a* of an oil pump 10. A primary pulley 7 of a belt type continuously variable transmission (CVT) 11 is arranged on the primary shaft 8. A sprocket 13 is rotatably supported on the primary shaft 8 via a low clutch $C_L$. The primary shaft 8 is shortened by arranging the input clutch 6 in the bore side of the rotor 2*a* of the motor/generator 2.

A secondary shaft (second shaft) 15 is arranged in parallel with the primary shaft 8. A secondary pulley 9 of the CVT 11, a simple planetary gear 19, an output gear 21, and a sprocket 20, interlocked to the sprocket 13 via a chain 22, are arranged on the secondary shaft 15. The planetary gear 19 and the CVT 11 form an infinitely variable transmission (IVT) 18 comprising a gear neutral (GN) position discussed below.

Further, a counter shaft 23 is provided. A large gear 25, engaged with the output gear 21 supported on the secondary shaft 15, and a small gear 26 are integrally fixed on the counter shaft 23. The small gear 26 is engaged with a gear 30 connected to a differential carrier of a differential device 29. The differential device 29 outputs a differential rotation to front axle shafts 31*l*, 31*r* connected to left and right front wheels respectively.

A sprocket (rotational element) 32, for driving auxiliary equipment 39, is fixed on the primary shaft 8 between the oil pump 10 and the primary pulley 7. An auxiliary equipment driving shaft 33 is arranged in parallel with the primary shaft 8. A chain 36 is over wrapped between a sprocket 35 fixed on one end of the driving shaft 33 and the sprocket 32 for driving the auxiliary equipment 39. A chain 41 is over wrapped between a sprocket 37 fixed on the other end of the driving shaft 33 and a sprocket 40 fixed on the input shaft of the auxiliary equipment 39. The auxiliary equipment 39 includes, for example, a water pump for cooling the internal engine, an alternator for a low tension battery used for the engine start (the voltage differs greatly from the voltage of the battery for driving based on the motor/generator 2, i.e., the voltage of the low tension battery is 12V, and the voltage of the battery for driving is 300V), a compressor for an air conditioner, and a pump for power steering. These devices are driven by the rotation of the primary shaft 8 via a transmission device 42. Other transmission devices, such as gears and belts, can be used as the transmission device 42.

An infinitely variable transmission (IVT) 18 structured by the CVT 11 and the planetary gear 19 will be described with reference to FIGS. 2–6. The details of the IVT, such as the supporting hydraulic system, is included in previously filed Japanese patent publications laying-open Nos. 8-261303, 8-326860, and 9-166191. The three patent publications are incorporated herein by reference.

Figure 2:
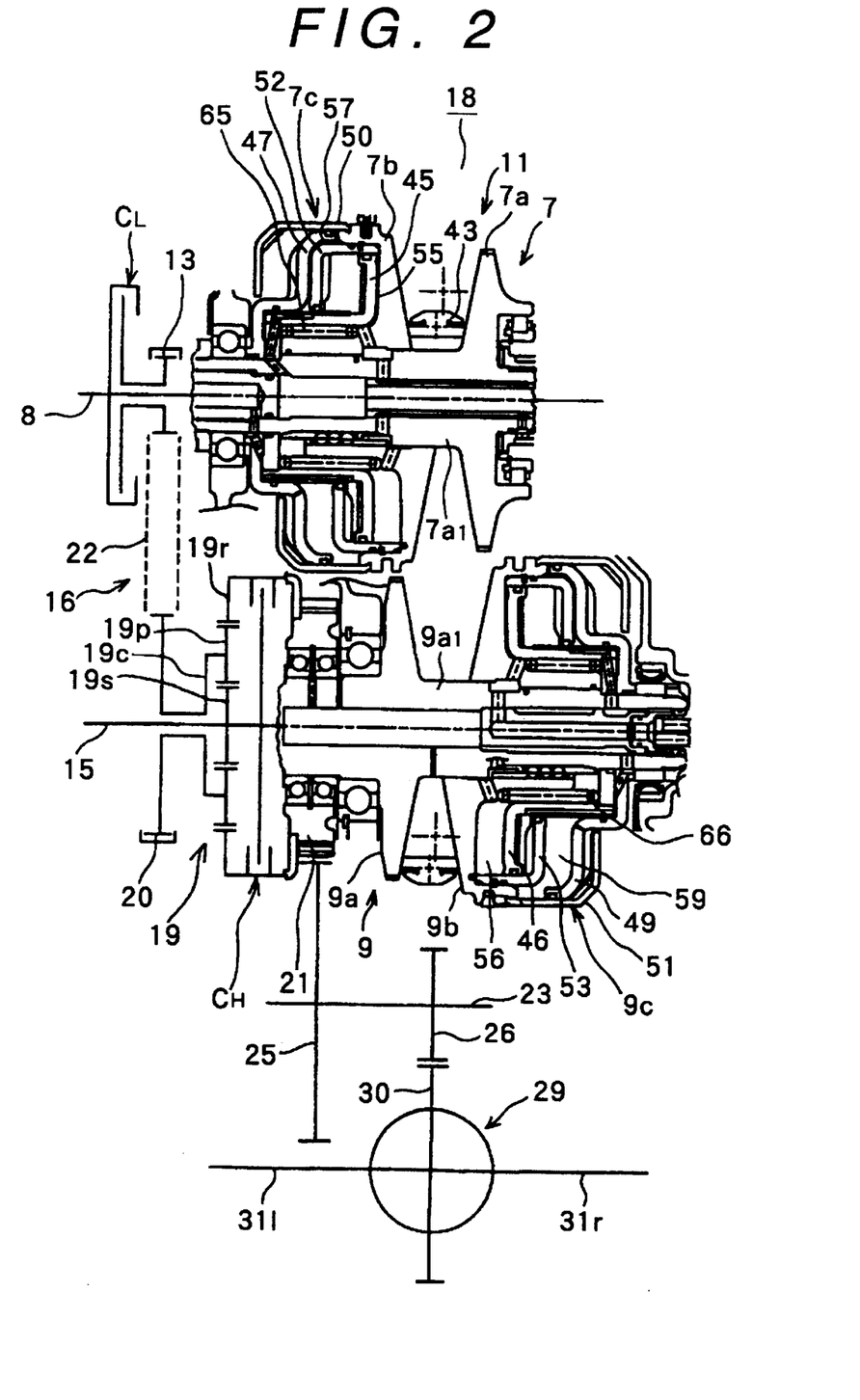
FIG. 2 is an elevational section view showing the infinitely variable transmission (IVT)

A rotation of a constant speed transmission system 16, which comprises the sprocket 13 connected to the output side of the low clutch $C_L$, the chain 22 and the sprocket 20, and the continuously shifting rotation of the CVT 11, which comprises the primary pulley 7, secondary pulley 9 and the belt 43, are synthesized so that a torque circulation, or torque path, occurs at the planetary gear 19. The planetary gear 19 is a single pinion planetary gear comprising a sun gear 19s, a ring gear 19r and a carrier 19c rotatably supporting a pinion 19p engaged with the sun gear 19s and the ring gear 19r. The sun gear 19s is connected to the secondary pulley 9 of the CVT 11 and structured as a second rotational element. The ring gear 19r is connected to the output gear 21 and structured as a third rotational element. The carrier 19c is connected to the sprocket 20 of the constant speed transmission system 16 and structured as a first rotational element.

The hydraulic actuators 7c, 9c, for the primary pulley 7 and the secondary pulley 9 respectively, comprise partition members 45, 46; cylinder members 47, 49, which are fixed on the stationary sheave bosses $7_1$, $9a_1$; drum members 50, 51 and second piston members 52, 53 which are fixed on the backs of the movable sheaves 7b, 9b, respectively. The partition members 45, 46 are fitted oil-tightly in the respective second piston members 52, 53. The second piston members 52, 53 are fitted oil-tightly in the respective cylinder members 47, 49 and on the respective partition members 45, 46 to provide the hydraulic actuators 7c, 9c double piston (or double chamber) structures which comprise first hydraulic chambers 55, 56 and second hydraulic chambers 57, 59, respectively.

The first hydraulic chamber 55, 56 in the respective hydraulic actuator 7c, 9c form piston faces at the backs of movable sheaves 7b, 9b. Their effective pressure receiving areas are equalized at the primary side and at the secondary side. In the primary side and secondary side stationary sheave bosses $7a_1$, $9a_1$, there are formed oil passages communicating with the first hydraulic chambers 55, 56 and oil passages communicating with the second hydraulic chambers 57, 59, respectively. Pre-loading springs 65, 66 are provided for urging the primary side and secondary side movable sheaves 7b, 9b, respectively, toward the stationary sheaves 7a, 9a.

The operation of the infinitely variable transmission (IVT) 18 will be described with reference to FIGS. 2–4. The rotations of the internal engine 1 and/or the motor/generator 2 are transmitted to the primary shaft 8. In a low mode of a D range in which the low clutch $C_L$ is engaged and a high clutch $C_H$ is disengaged, the rotation of the primary shaft 8 is transmitted to the primary pulley 7 and, further, to the carrier 19cof the planetary gear 19 via the constant speed transmission system 16 comprising the primary side sprocket 13, the chain 22 and the secondary side sprocket 20. The rotation of the primary pulley 7 is continuously varied by controlling the pulley ratio of the primary 7 and secondary 9 pulley using the hydraulic actuators 7c, 9c, to be discussed below, and the varied rotation is transmitted to the secondary pulley 9, and further, the shifted rotation of the secondary pulley 9 is transmitted to the sun gear 19s of the planetary gear 19.

Figure 3:
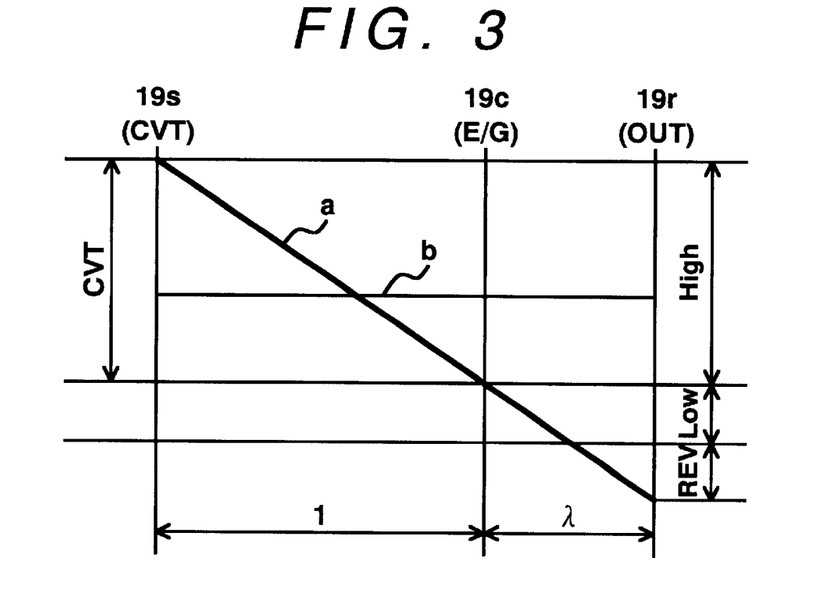
FIG. 3 is a velocity diagram.

In the planetary gear 19, as shown in the velocity diagram of FIG. 3, the carrier 19c, to which the constant speed rotations are transmitted through the constant speed transmission system 16, acts as a reaction element, and the continuously variable rotations from the belt type continuously variable transmission (CVT) 11 are transmitted to the sun gear 19s. The rotations of the carrier 19c and the sun gear 19s are synthesized and transmitted to the output gear 21 through the ring gear 19r. At that time, the torque circulation occurs in the planetary gear 19 because the output gear 21 is connected to the ring gear 19r, which is a rotational element other than the reaction supporting element. The gear 21 rotates in forward (Low) and backward (Rev) directions across the zero rotation because the sun gear 19s and the carrier 19c rotate in the same direction. That is, on the basis of the torque circulation, the torque is transmitted, during the forward rotations, from the secondary pulley 9 to the primary pulley 7 and, during the backward rotations, from the primary pulley 7 to the secondary pulley 9.

In a high mode, in which the low clutch $C_L$ is disengaged and the high clutch $C_H$ is engaged, the transmission to the planetary gear 19 via the constant speed transmission system 16 is disconnected so that the planetary gear 19 is brought into an integrally rotating state by engaging the high clutch $C_H$. As a result, the rotations of the input, or primary, shaft 8 are transmitted to the output gear 21 exclusively via the belt type continuously transmission (CVT) 11 and the high clutch $C_H$. That is, the CVT 11 transmits the power from the primary pulley 7 to the secondary pulley 9. Further, the rotations of the output gear 21 are transmitted to the differential unit 29 via the gears 25, 26 of the counter shaft 23 and then to the left and right front wheels via the left and right axles 31l, 31r.

Figure 5:
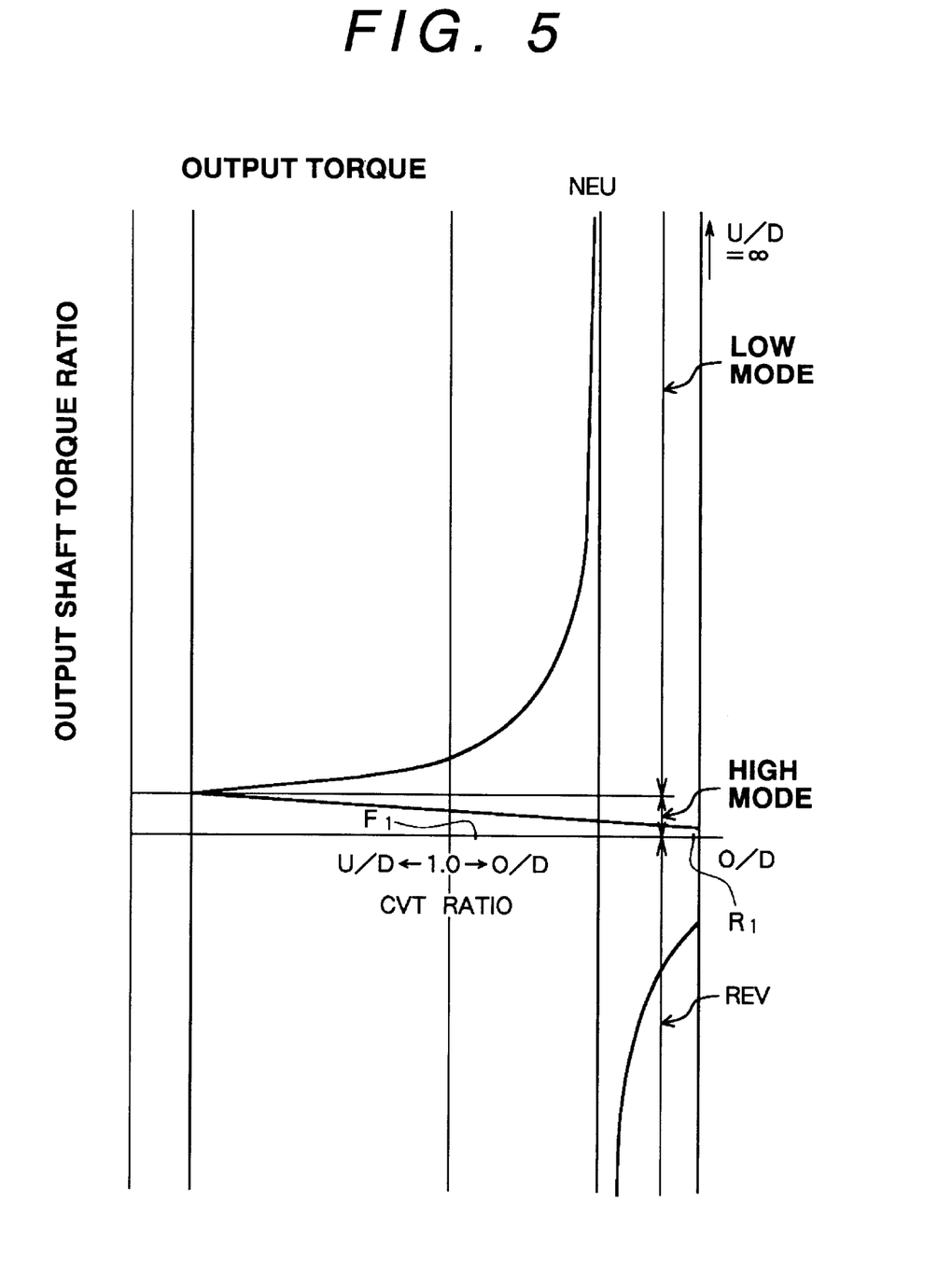
FIG. 5 shows a change in the output torque from the IVT related to a torque ratio of a belt type continuously variable transmission (CVT)
Figure 6:
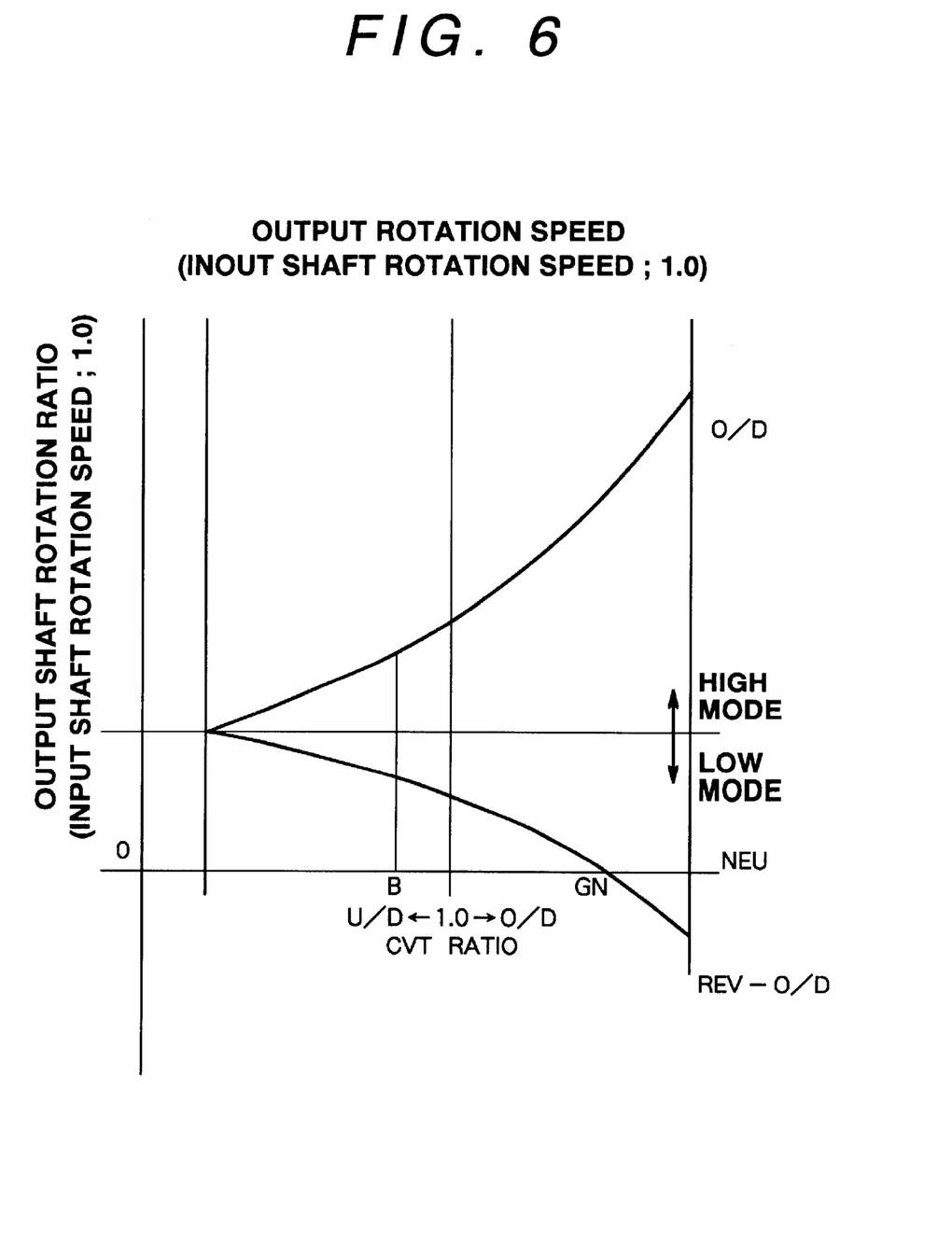
FIG. 6 shows a change of the output rotation speed of the IVT related to the torque ratio of the CVT.

As shown in the velocity diagram of FIG. 3, in the output torque diagram of FIG. 5 and in the output RPM diagram of FIG. 6, in the low mode, the sun gear 19s rotates at the maximum when the belt type continuously variable transmission (CVT) 11 is at the limit (the O/D end) in the acceleration direction. On the basis of this, the ring gear 19r is rotated backward of the rotations of the carrier 19c at a constant RPM, and the backward rotation (REV) is transmitted to the output gear 21. When the CVT 11 is varied in the decelerating (U/D) direction, the RPM of the backward rotation is decreased to established a neutral position (NEU), in which the RPM of the output gear 21 is zero, at a predetermined pulley ratio determined by the gear ratio between the planetary gear 19 and the constant speed transmission system 16. Further, when the CVT 11 is varied in the decelerating (U/D) direction, the ring gear 19r is switched in the forward direction so that the forward rotations are transmitted to the output gear 21. At that time, the torque of the output gear 21 infinitely converges toward but never reaches the neutral position NEU shown in FIG. 5.

Then, when the CVT reaches the end of the decelerating (U/D) direction, the high clutch $C_H$ is engaged to switch to the high mode. In the high mode, the output rotation of the CVT 11 is transmitted as it is to the output gear 21 so that it becomes a parallel line as indicated with b in the velocity curve of FIG. 3. Then, as the CVT 11 is shifted in the accelerating (O/D) direction, the rotation of the output gear 21 is changed into the accelerating direction so that the transmission torque is reduced accordingly. λ in FIG. 3 designates a ratio (Zs/Zr) between the tooth number Zs of the sun gear and the tooth number Zr of the ring gear.

Figure 4:
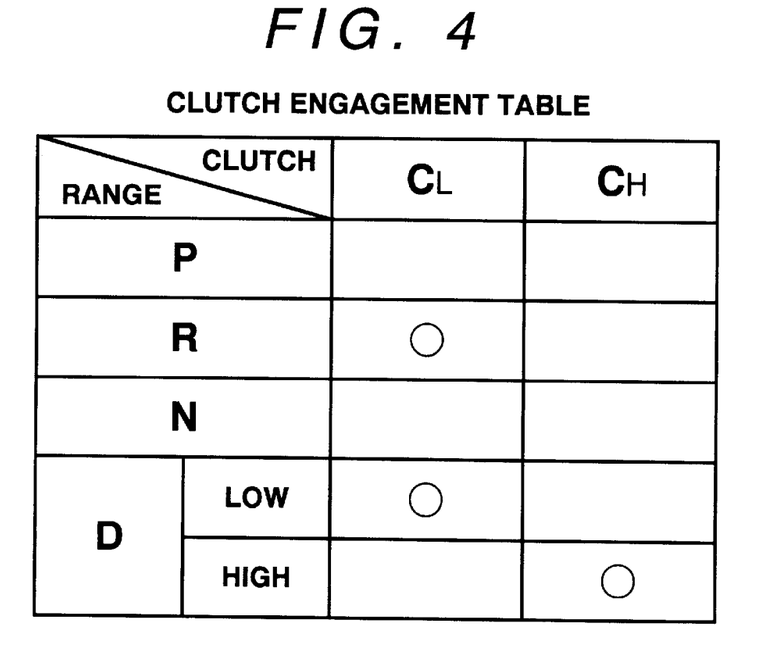
FIG. 4 shows an engagement state of each clutch.

In a parking range P and in a neutral range N shown in FIG. 4, both the high clutch $C_H$ and the low clutch $C_L$ are disengaged to cut the power from the internal engine 1. At that time, in the parking range P, the differential unit 29 is locked to lock the axles 31l, 31r.

The boss $7a_1$, of the stationary sheave 7a of the primary pulley 7 is engaged with spline on the primary shaft 8, and the movable sheave 7b is axially movably supported on the stationary sheave boss $7a_1$. The movable sheave 7b is moved by a hydraulic actuator 7c. In the secondary pulley 9, the stationary sheave 9a is structured integrally with the secondary shaft 15. The movable sheave 9b is axially movably supported on the stationary sheave 9a. The movable sheave 9b is moved by a hydraulic actuator 9c.

Then, when the vehicle is in D range or R range and the vehicle speed is lower than a predetermined velocity and the accelerator pedal is released, a gear neutral signal is output from a control unit, the first hydraulic chambers 55, 56 in the hydraulic actuators 7c, 9c of the primary and secondary pulleys are applied with hydraulic pressures and the hydraulic pressures are relieved in the second hydraulic chambers 57 59, so that the axial forces of the pulleys 7, 9 are substantially equalized. That is, the difference between the primary and secondary pulleys 7, 9 is controlled either to a value smaller than the axial force difference, which is determined by the input torque and the pulley ratio of the CVT 11 at the instant of the positive output torque direction, of the pulleys while the difference does not become negative, or to such a value smaller than the axial force difference, which is determined by the input torque and the pulley ratio of the CVT 11 at the instant of the negative output torque direction, of the pulleys while the difference does not become negative.

A force $F_N$ causes the CVT 11 to self-converge from the forward or backward region to the gear neutral (GN) point. Then, when the GN point is reached and maintained, the IVT 18 is moved into a no-load state or a state infinitely close to the no-load state. The CVT 11 itself is driven toward a state where the primary 7 and secondary 9 pulleys are balanced by the belt tension, that is, where the pulley ratio is at 1.0, so that a force $F_A$ is directed toward the pulley ratio 1.0. As a result, simultaneously as the CVT 11 moves to the GN point so that the IVT 18 takes the no-load state, the force $F_A$, with which the CVT 11 moves toward the pulley ratio of 1.0, occurs. The force $F_A$ toward the pulley ratio of 1.0 in the no-load state of the CVT 11 and the force $F_N$ toward the GN point in the load state of CVT 11 and no-load state of the IVT 18, as established when the CVT 11 is brought out of the GN point by the force $F_A$, come into the vortex state, so that forward creep torque occurs.

In D range, the low clutch $C_L$ is engaged, and the second hydraulic chamber 59 of the secondary side is applied with the hydraulic pressure gradually while the first hydraulic chambers 55, 56 of the primary and secondary sides are applied with the predetermined pressures so that the pulley ratio varies from the gear neutral (GN) point in the direction of under drive (U/D) in which the effective radius of the secondary pulley 9 is increased. In this state, the torque, which is transmitted from the primary shaft 8 to the carrier 19c of the planetary gear 19 via the low clutch $C_L$ and the constant speed transmission system 16, is output to the output gear 21 via the ring gear 19r while the torque is limited by the CVT 11 having a predetermined pulley ratio via the sun gear 19s.

When the CVT 11 reaches a predetermined ratio in U/D, the low clutch $C_L$ is disengaged and the high clutch $C_H$ is engaged, the CVT 11 is changed so that the hydraulic pressure is applied to the second hydraulic chamber 57 of the primary side. In this state, the torque of the primary shaft 8 is properly varied by the CVT 11, in which the torque is transmitted from the primary pulley 7 to the secondary pulley 9, and is extracted from the output gear 21 via the high clutch $C_H$. The down shift is performed with the opposite hydraulic control. The down shift in the low mode is prohibited mechanically when the pulley ratio is lower than a predetermined value.

In R range, the low clutch $C^L$ is engaged, and the second hydraulic chamber 57 of the primary side is applied with the hydraulic pressure gradually while the first hydraulic chambers 55, 56 of the primary and secondary sides are applied with the predetermined pressures so that the pulley ratio varies from the gear neutral (GN) point to the direction of over drive (O/D) in which the effective radius of the primary pulley 7 is increased. In this state, the rotations of the constant speed transmission system 16 and the CVT 11 are synthesized at the planetary gear 19, and the reverse rotation is extracted from the output gear 21 because the constant speed rotation is faster than the variable rotation.

Next, the operation of the hybrid drive system of the first embodiment will be described with reference to FIG. 1.

When a vehicle is in a driving (system starting) state by turning on an ignition switch, current is provided to the motor/generator 2 causing it to rotate so that the primary shaft 8 is rotated. As a result, the oil pump 10 is driven, and the auxiliary equipment 39 is driven via the transmission device 42. At that time, the input clutch 6 is in the disengaging state, the infinitely variable transmission (IVT) 18 is in the gear neutral (GN) state, then the primary shaft 8 is in a low load state for driving only the auxiliary equipment 39 and the oil pump 10.

A brushless DC motor, having a permanent magnet as the rotor 2a, is used as the motor/generator 2, and a armature is used as a stationary element (stator) 2b. The rotational speed, for example, is controlled by control elements, such as a power MOS-FET, IGBT, or S transistor used as choppers. In the brushless DC motor, the control, in which a position of a rotational magnetic field and a position of the rotational element are detected and a current is sent to each pole with a proper timing, is needed. When the rotational speed is faster than a predetermined rotational speed, the positions are detected by a current waveform and it is possible to control the rotational speed properly by closed-loop control. In a low rotation state, for example, at the start, generally, it is necessary to detect the position of the rotor 2a using a rotational position detecting means (sensor), such as a resolver.

At the start of the motor/generator 2, the motor has only a light load from the auxiliary equipment. Therefore, it is not necessary to detect the position of the rotor correctly. That is, the motor is rotated as a trial rotation, the brushless DC motor can be started after detecting the rotor position using a trial rotation. As a result, the rotational position detecting means, which is expensive and is needed in the prior art, is not needed.

In the case a vehicle must repeatedly be required to start and stop (such as in a town), the vehicle is started by the torque of the motor/generator 2 while the input clutch 6 is disengaged. At that time, the IVT 18 is in a state close to the gear neutral (GN) point and has a high torque ratio (with reference to FIG. 5). Therefore, the vehicle is started easily by using the high motor efficiency of the motor/generator 2.

Further, in a motor operating region related to the charging capacity of the battery, the input clutch 6 is engaged at a rotational speed with which the motor/generator 2 generates the maximum torque and the internal engine 1 is started. At that time, at the start at which the IVT 18 is close to the GN point, the torque of the motor/generator 2 is limited so that the IVT 18 has the maximum torque within a limited safe torque range of the IVT 18, i.e. outside the safe torque range the IVT 18 may suffer damage. Then, the pulley ratio of the belt type CVT 11 is controlled so that the motor achieves a target rotation. Then, the motor/generator 2 assists the internal engine 1 in a region, in which an engine efficiency is low, related to the battery charging capacity. Then, further, a region, in which the motor efficiency is good, is used frequently so that a fuel consumption is increased and an exhaust gas is cleaned.

The operations of engagement and disengagement for the input clutch 6, the low clutch $C_L$, and the high clutch $C_H$ by the hydraulic pressure and the variable operation for the hydraulic actuator 7c, 9c of the CVT 11 are not delayed even when the engine 1 is stopped, because the oil pump 10 is driven by the motor/generator 2 so that the operations are performed immediately.

In the case where the charge of the battery for driving is enough, it is possible to drive with only the motor/generator 2 while the internal engine 1 is stopped and the input clutch 6 is disengaged.

When the vehicle is stopped by, for example, operating the brake, the motor/generator 2 is operated as a generator (regenerative brake), and the motor/generator 2 generates an electric power in consideration of a needed brake force. At that time, only the first hydraulic chambers 55, 56 of the primary 7 and the secondary 9 pulleys are applied with the predetermined hydraulic pressures so that the IVT 18 is self-converged toward the GN point. The input torque of the IVT 18 is increased by controlling the output torque of the motor/generator 2 so that the self-convergence toward the GN point is achieved quickly. As a result, the vehicle can be brought to a rapid stop, such as in rapid braking. The increase in the speed of the self-convergence toward the GN point by the input torque control for the IVT 18 is performed easily and correctly, compared with the torque control for the internal engine, by the motor/generator 2. Therefore, even when the rapid brake is operated, the IVT 18 can be moved to the GN point absolutely and kept in that state.

When the vehicle is in a decelerating state in which an engine brake is operated, that is, in a negative driving state, the motor/generator 2 is controlled so that the vehicle is in a positive driving state (in which the power is transmitted from the power source to the vehicle wheels). Therefore, it is not possible to operate the large engine brake caused by the IVT 18 taking a very large gear ratio.

Another embodiments will be described with reference to FIGS. 7–10. The same portions as found in the hybrid drive system shown in FIG. 1 are identified by the same notations and reference numerals, and detailed descriptions are omitted.

Figure 7:
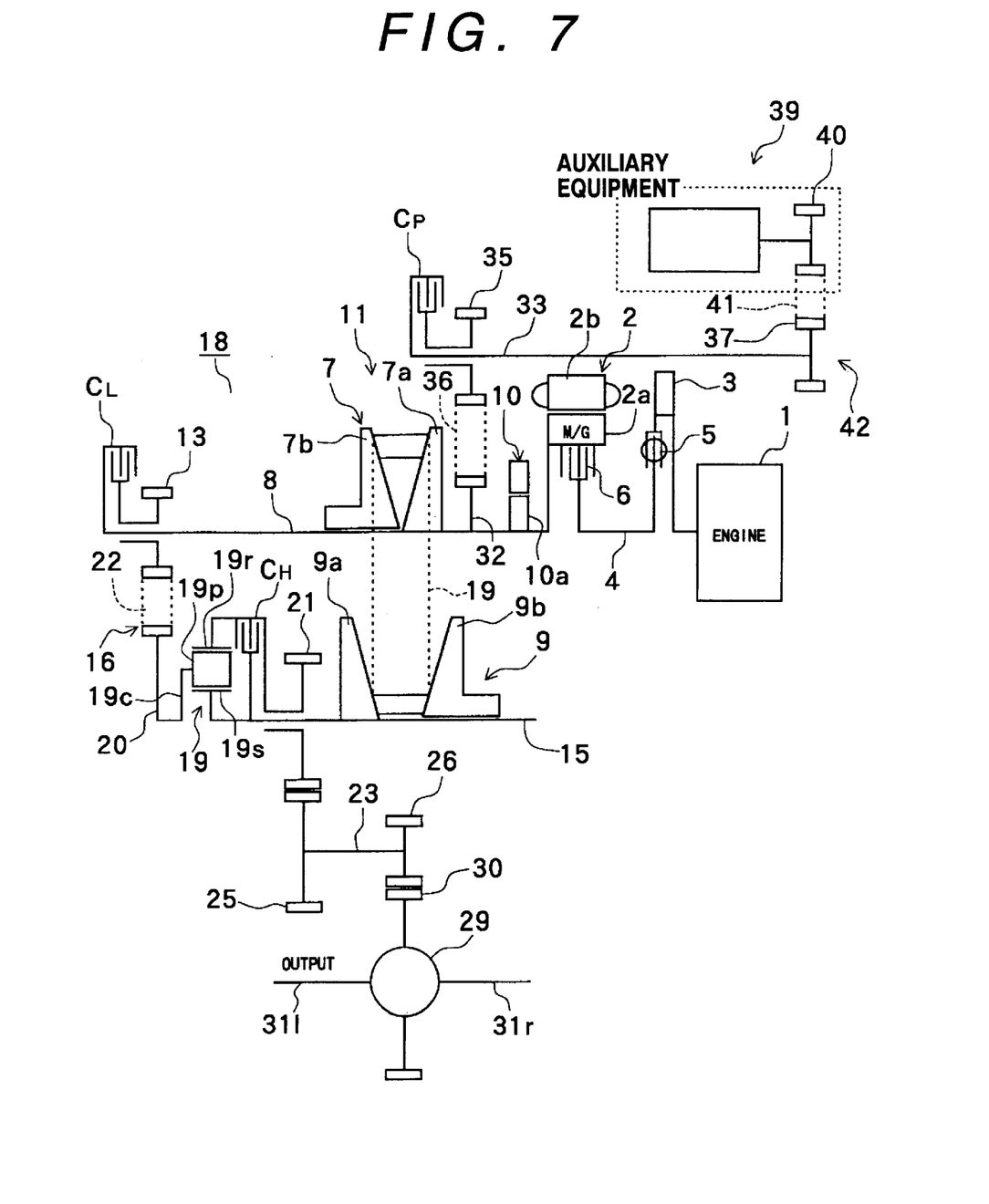
FIG. 7 is a schematic illustration showing a hybrid drive system of a second embodiment.

FIG. 7 shows a second embodiment in which a clutch $C_P$ is interposed in the transmission device 42 transmitting to the auxiliary equipment 39. Specifically, the clutch $C_P$ is interposed between the sprocket 35 and the shaft 33.

In the first embodiment, the motor/generator 2 is started while a low load is applied by the auxiliary equipment 39. In this embodiment, the motor/generator 2 is started while the clutch $C_P$ is disengaged. Therefore, the motor/generator 2, comprised of a brushless DC motor, is started in an almost no load state in which the low load by the auxiliary equipment 39 is not applied and only the oil pump 10 is operated. As a result, the rotor position detecting means (sensor), which is needed in the prior art at low rotations, such as the start, is even less necessary.

Figure 8:
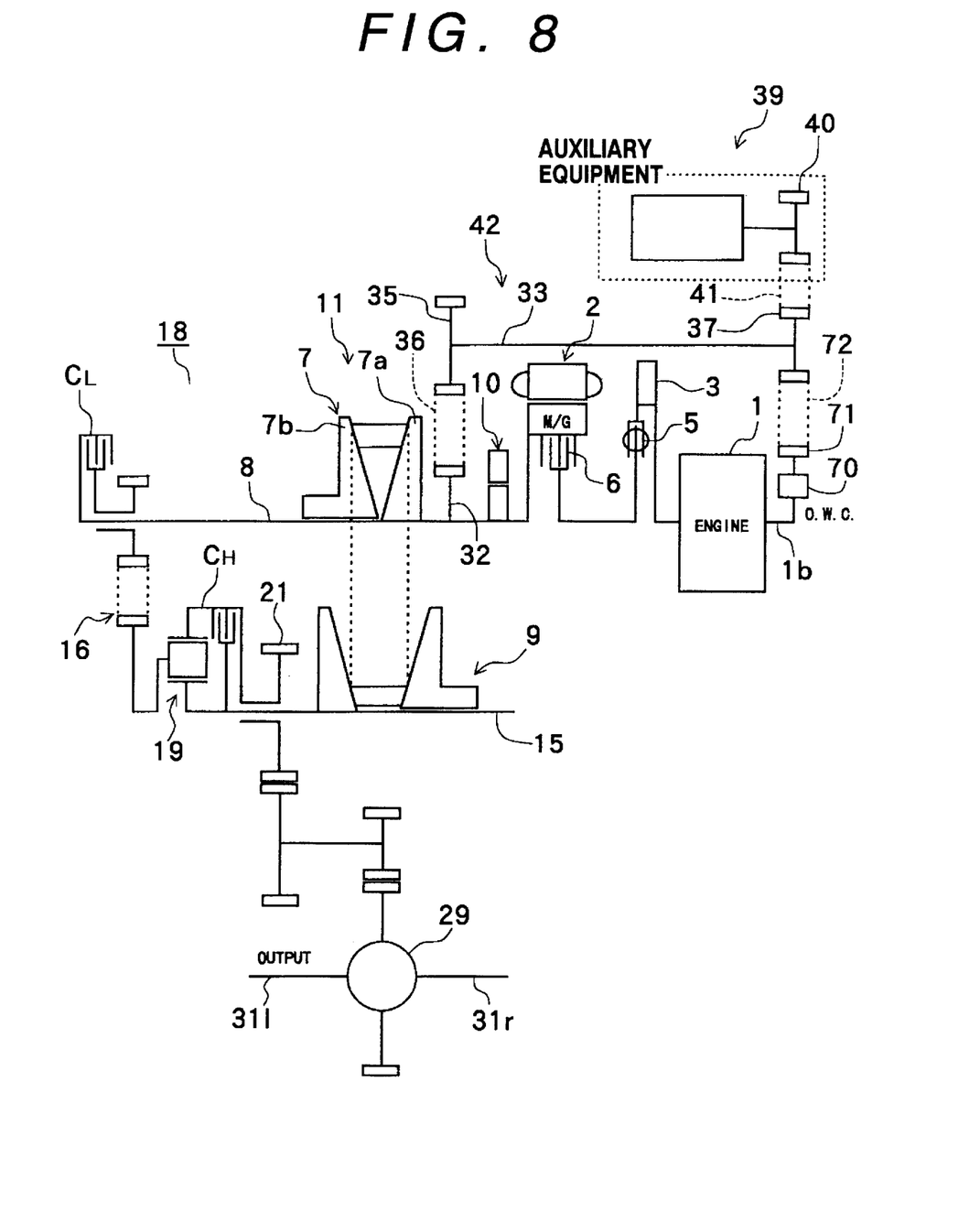
FIG. 8 is a schematic illustration showing a hybrid drive system of a third embodiment.

FIG. 8 shows a third embodiment incorporating a power transmission line with which the engine 1 drives the auxiliary equipment 39. A sprocket 71 is connected to an output shaft extending from the other side of the engine 1 than the motor/generator side via a one-way clutch 70. Further, the sprocket 71 and a predetermined part, such as the sprocket 37 of the transmission device 42 for driving the auxiliary equipment, are interlocked by over-wrapping with a chain 72. The sprocket 37 is a double sprocket for chains 41, 72.

Therefore, the auxiliary equipment 39 has a power transmission line from the motor/generator 2 via the transmission device 42 (sprocket 32, chain 36, sprocket 35, shaft 33, sprocket 37, chain 41, and sprocket 40) and a power transmission line from the output shaft 1b of the internal engine 1 via the one-way clutch 70 (sprocket 71, chain 72, sprocket 37, chain 41, and sprocket 40). The auxiliary equipment 39 is driven by the faster rotations of the motor/generator 2 and the engine 1. That is, when the rotation of the engine output shaft 1b is slower than the rotation of the sprocket 71 which is transmitted from the motor/generator 2 via the transmission device 42, the one-way clutch 70 is freed and the auxiliary equipment 39 is driven by the motor/generator 2. When the rotation of the engine output shaft 1b is faster than the rotation of the sprocket 71, the one-way clutch 70 is locked and the auxiliary equipment 39 is driven by the internal engine 1.

Further, because the transmission device 42 is also interlocked with the oil pump 10 via the sprocket 32 and the primary shaft 8, the oil pump 10 is driven by one of the motor/generator 2 and the internal engine 1. At that time, the one-way clutch 70 operates in the same way as for drive of the auxiliary equipment 39.

In the case where the motor/generator 2 can not be started because the (high tension) battery for driving is discharged, the internal engine 1 is started by the starter motor by the low tension (12V) battery which is charged by the alternator of the auxiliary equipment 39. Then, the rotation of the engine output shaft 1b is transmitted to the auxiliary equipment 39 via the one-way clutch 70, the sprocket 71, the chain 72, the sprocket 37, the chain 41 and the sprocket 40, and transmitted to the primary shaft 8 via the transmission device 42 (33, 35, 36, 32) so that the oil pump 10 is driven. At that time, the motor/generator 2 is not in the generating state and is raced.

In this state, the hydraulic pressure is obtained by driving the oil pump 10 and the input clutch 6 is engaged so that the torque of the internal engine 1 is transmitted to the primary shaft 8 via the flywheel 3, the damper 5, the input clutch 6 and the rotor 2a of the motor/generator. The IVT 18 is controlled so that the actual rotation of the internal engine 1 achieves a target rotation calculated based on a maximum power curve or a minimum fuel consumption curve. Further, the motor/generator 2 is operated as the generator in a region having a good efficiency so that the (high tension) battery for driving is charged. At that time, the rotation of the internal engine 1 drives the auxiliary equipment 39 via the transmission device 42 by engaging the input clutch 6 and the one-way clutch 70 is in free state.

Figure 9:
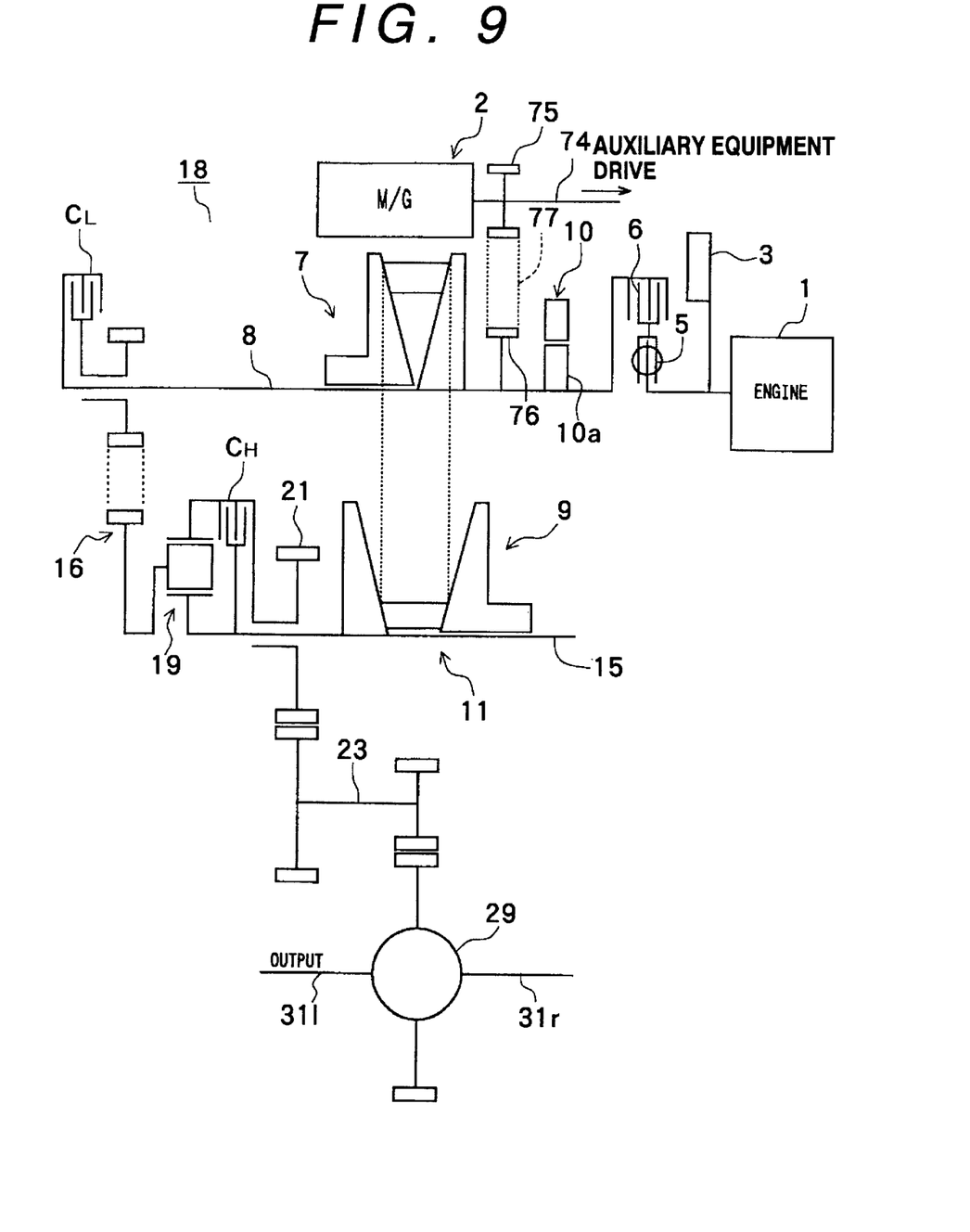
FIG. 9 is a schematic illustration showing a hybrid drive system of a fourth embodiment.

FIG. 9 shows a fourth embodiment arranging the motor/generator 2 on a different shaft than the primary shaft 8. A fourth shaft 74, which is different from the primary shaft 8, the secondary shaft 15 and the counter shaft 23, is arranged in parallel with the shafts 8, 15, 23, the rotor of the motor/generator 2 is fixed to the shaft 74, and a sprocket 75 is fixed to the shaft 74. Further, the transmission device (not shown) for driving the auxiliary equipment 39 is connected to the shaft 74. A sprocket 76 is fixed to the primary shaft 8 and the sprocket 76 and the sprocket 75 are interlocked by a chain 77.

Therefore, the torque of the internal engine 1 is transmitted to the primary shaft 8 via the damper 5 and the input clutch 6, and the torque of the motor/generator 2 is transmitted to the primary shaft 8 via the shaft 74, the sprocket 75, the chain 77 and the sprocket 76. In this embodiment, the motor/generator 2 is arranged on the shaft 74 different from the first shaft 8 aligned with the engine 1. Therefore, the primary shaft 8 is shortened. In addition, the entire hybrid drive system is shortened in the axial direction.

Figure 10:
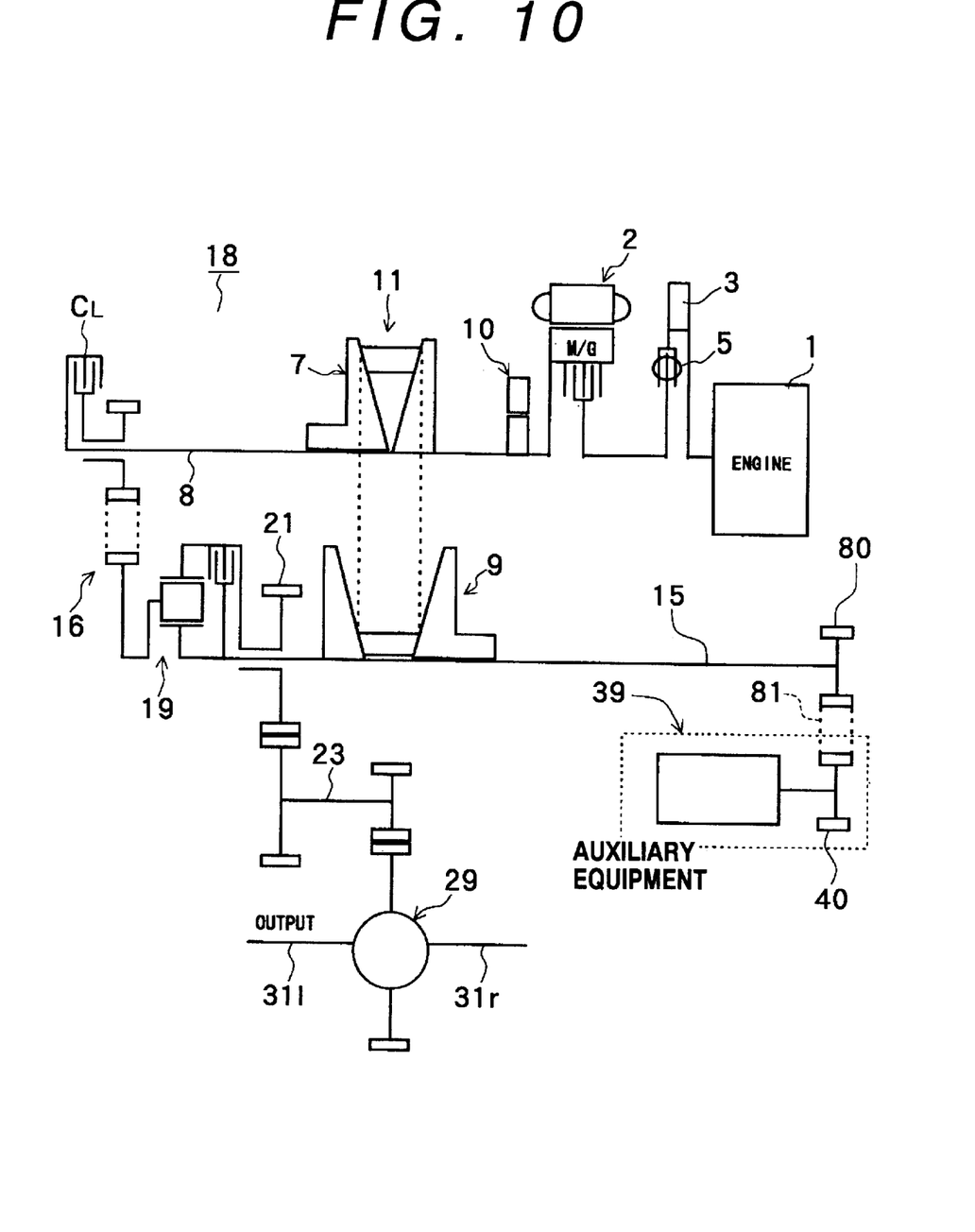
FIG. 10 is a schematic illustration showing a hybrid drive system of a fifth embodiment.

FIG. 10 shows a fifth embodiment in which the auxiliary equipment is driven by the secondary shaft 15. A sprocket 80 is fixed on the end of the secondary shaft 15, and a chain 81 is over-wrapped between the sprocket 80 and the input sprocket 40 of the auxiliary equipment 39.

In this structure, the rotation of the motor/generator 2 and/or the internal engine 1 is transmitted to the primary shaft 8 so that the oil pump 10 is driven. The rotation is varied properly at the IVT 18. Further, the varied rotation is output from the output gear 21. The rotation of the primary shaft 8 is varied properly at the CVT 11. The varied rotation is transmitted to the secondary shaft 15. Further, the rotation of the secondary shaft 15 drives the auxiliary equipment 39 via the sprocket 80, the chain 81, and the sprocket 40. At that time, even when the IVT 18 is in the gear neutral GN state and the output gear 21 has stopped rotating, that is, even when the vehicle is stopped at, for example, an intersection, the CVT 11 rotates the secondary shaft 15 in a predetermined variable state. Therefore, the auxiliary equipment 39 is rotated with a predetermined rotation. In the predetermined variable state, the IVT 11 has a pulley ratio for maintaining the gear neutral. The predetermined rotation is the rotation at the gear neutral.

In the gear neutral state, the secondary shaft 15 rotates faster than the primary shaft 8, therefore, the auxiliary equipment 39 is rotated rapidly. The sprocket 32 for driving the auxiliary equipment 39 is not arranged on the primary shaft 8 which is aligned with the internal engine 1. Therefore, the primary shaft 8 is shortened and the entire hybrid drive system is shortened in the axial direction.

In these embodiments, the belt type continuously variable transmission is used as the continuously variable transmission (CVT). Another continuously variable transmissions, such as a toroidal type, can also be used.

What is claimed is:

1. A hybrid drive system, comprising:
   an internal engine;
   a motor/generator which is rotated and generates electric energy; and
   an infinitely variable transmission, which comprises a continuously variable transmission arranged between a primary shaft and a secondary shaft and shifts a torque ratio between these shafts continuously, a planetary gear unit comprising a first rotational element interlocking with a primary side of the continuously variable transmission mounted on the primary shaft, a second rotational element interlocking with a secondary side of the continuously variable transmission mounted on the secondary shaft, and a third rotational element combining rotations of the first rotational element and the second rotational element in a state where torque circulation occurs and the combined rotation is output to driving wheels, the infinitely variable transmission performing a neutral control self-converging in order that the third rotational element is in a neutral position and a shift control shifting continuously from the neutral position to the continuously variable transmission, wherein outputs from at least one of the motor/generator and the internal engine is transmitted to the drive wheels via the infinitely variable transmission.

2. The hybrid drive system according to claim 1, wherein an input clutch is arranged between an output shaft of the internal engine and a rotor of the motor/generator.

3. The hybrid drive system according to claim 2, wherein the rotor of the motor/generator is interlocked with an oil pump.

4. The hybrid drive system according to claim 3, wherein a vehicle is started by a torque from the motor/generator when the input clutch is disengaged, the infinitely variable transmission is moved to the neutral position and the oil pump is driven by the motor/generator when the vehicle is stopped.

5. The hybrid drive system according to claim 3, wherein the oil pump is arranged on a primary shaft.

6. The hybrid drive system according to claim 2, wherein the vehicle is driven by power of the internal engine upon engagement of the input clutch, and the motor/generator one of provides a power assist to the internal engine and outputs electric current.

7. The hybrid drive system according to claim 2, wherein the input clutch is arranged in a bore side of a rotor of the motor/generator.

8. The hybrid drive system according to claim 2, wherein the rotor of the motor/generator interlocks with an auxiliary equipment.

9. The hybrid drive system according to claim 8, wherein the motor/generator is arranged on the primary shaft, another shaft which interlocks with the auxiliary equipment and different from driving system such as the primary shaft is provided, and the another shaft is drivingly-connected with the primary shaft.

10. The hybrid drive system according to claim 8, wherein a vehicle is started by torque from the motor/generator when the input clutch is disengaged, and the infinitely variable transmission is moved to a neutral position and the auxiliary equipment is driven by the motor/generator when the vehicle is stopped.

11. The hybrid drive system according to claim 1, wherein the motor/generator is arranged on the primary shaft.

12. The hybrid drive system according to claim 1, wherein the auxiliary equipment is arranged to interlock with rotational elements of the infinitely variable transmission except the third rotational element.

* * * * *

UNITED STATES PATENT AND TRADEMARK OFFICE
CERTIFICATE OF CORRECTION

PATENT NO. : 6,269,895 B1
DATED : August 7, 2001
INVENTOR(S) : Takao Tanuguchi et al.

It is certified that error appears in the above-identified patent and that said Letters Patent is hereby corrected as shown below:

Column 12,
Please add claims 13-20 as follows:

-- 13. The hybrid drive system according to claim 8, wherein a clutch is arranged between the rotor of the motor/generator and the auxiliary equipment. --

-- 14. The hybrid drive system according to claim 2, wherein the oil pump is interlocked with the rotor of the motor/generator and the output shaft of the internal engine, and the oil pump is driven by one of the motor/generator and the internal engine. --

-- 15. The hybrid drive system according to claim 14, wherein the output shaft of the internal engine and the oil pump are interlocked with each other via a one-way clutch, and the rotor of the motor/generator and the oil pump are directly interlocked with each other. --

-- 16. The hybrid drive system according to claim 15, wherein the motor/generator and the oil pump are arranged on the primary shaft and interlocked, another shaft different from the primary shaft is provided, the another shaft is interlocked with the output shaft of the internal engine via a one-way clutch. --

-- 17. The hybrid drive system according to claim 2, wherein the auxiliary equipment interlocks with the rotor of the motor/generator and the output shaft of the internal engine, and the auxiliary equipment is driven by one of the motor/generator and the internal engine. --

-- 18. The hybrid drive system according to claim 17, wherein the output shaft of the internal engine interlocks with the auxiliary equipment via a one-way clutch, and the rotor of the motor/generator directly interlocks with the auxiliary equipment. --

UNITED STATES PATENT AND TRADEMARK OFFICE
CERTIFICATE OF CORRECTION

PATENT NO. : 6,269,895 B1
DATED : August 7, 2001
INVENTOR(S) : Takao Tanuguchi et al.

It is certified that error appears in the above-identified patent and that said Letters Patent is hereby corrected as shown below:

-- 19. The hybrid drive system according to claim 18, wherein another shaft which interlocks with auxiliary equipment and is different from the driving system, such as the primary shaft, is provided, one end of another shaft interlocks with the rotor of the motor/generator, and an opposite other end of the another shaft interlocks with the output shaft of the internal engine via a one-way clutch. --

-- 20. The hybrid drive system according to claim 1, wherein another shaft, different from the primary shaft and the secondary shaft, is provided, the motor/generator is arranged on the another shaft, and the another shaft is drivenly connected with the primary shaft. --

Signed and Sealed this

Nineteenth Day of March, 2002

Attest:

JAMES E. ROGAN
*Director of the United States Patent and Trademark Office*

*Attesting Officer*